April 21, 1970     P. J. CARP     3,507,168

TRANSMISSION, ESPECIALLY FOR VEHICLES

Filed Jan. 24, 1968     4 Sheets-Sheet 1

Inventor
Peter J. Carp
By
Watson, Cole, Grindle + Watson
Attys.

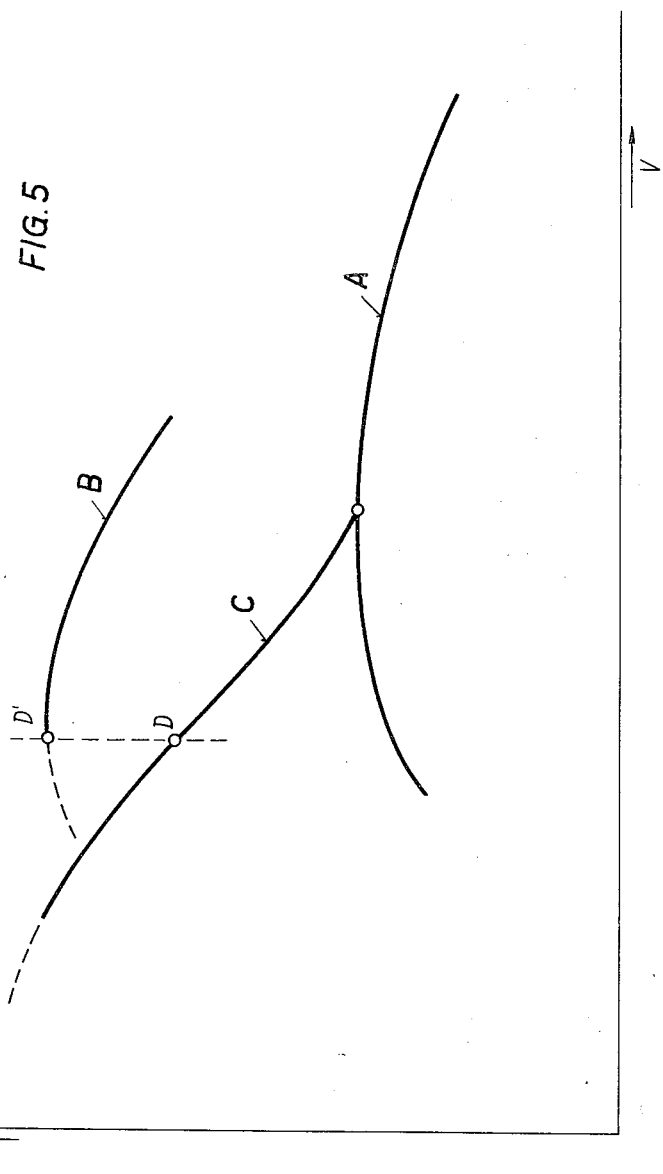

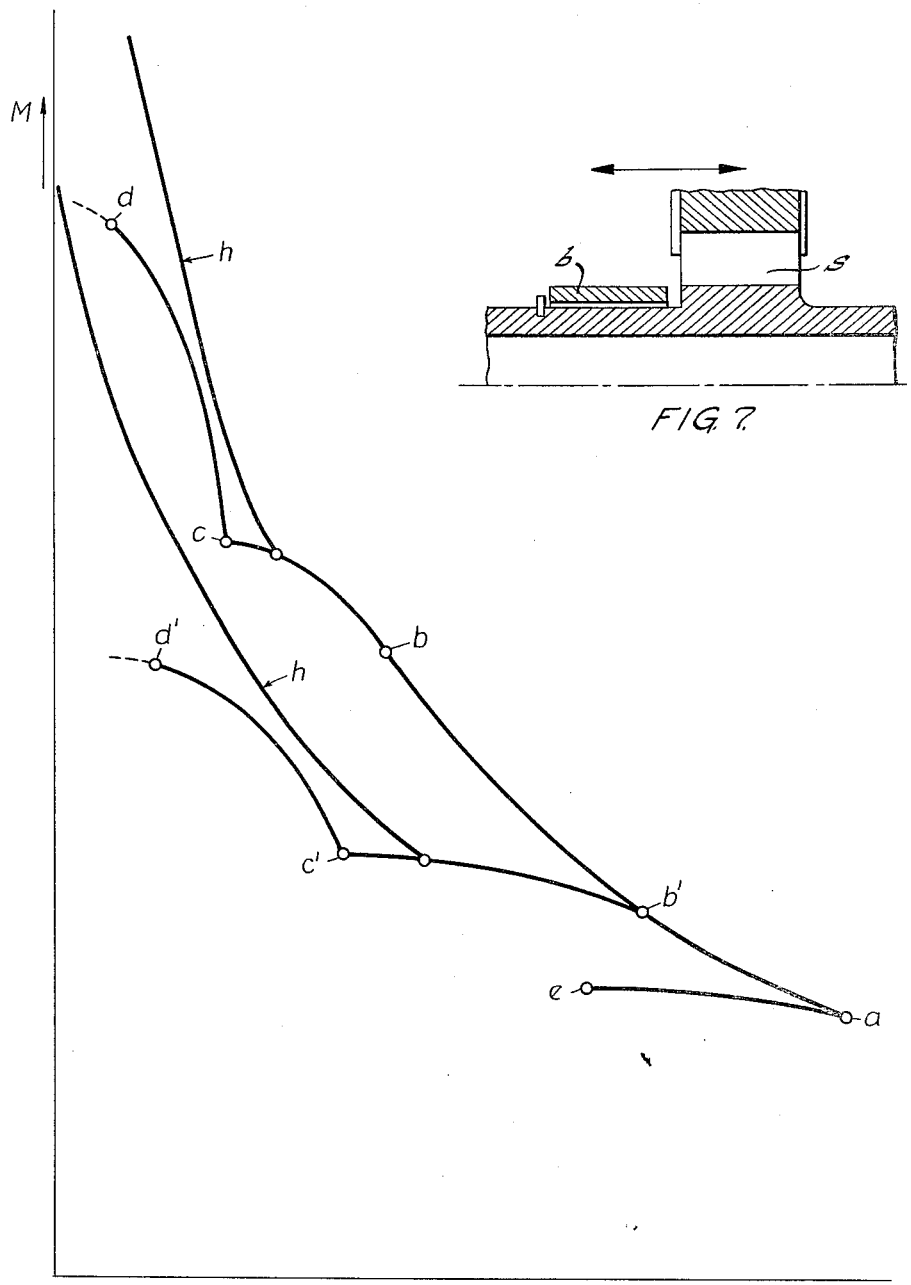

United States Patent Office
3,507,168
Patented Apr. 21, 1970

3,507,168
TRANSMISSION, ESPECIALLY FOR VEHICLES
Peter J. Carp, 16 Quai de Stalingrad,
Hauts-de-Seine, Boulogne, France
Filed Jan. 24, 1968, Ser. No. 700,064
Claims priority, application Germany, Jan. 25, 1967,
C 41,330
Int. Cl. F16h 47/08
U.S. Cl. 74—688                                    4 Claims

ABSTRACT OF THE DISCLOSURE

A transmission for automotive vehicles having a coupling converter with a clutch connected with an input shaft and the converter and clutch being connected to a planetary gearing through a drive line. The planetary gearing includes a gear shaft and drive-split gearing with a clutch between the drive lines and the converter and having a stall conversion of 2.8 or more with the drive splitting means having a hydraulic drive line.

---

This invention refers to a torque converter transmission especially for automotive use.

Transmissions of this kind are known, especially those with an "open" converter of the well-known Foettinger-Trilok variety (coupling-converter) working together with a multiple-ratio planetary gear box. Equally known are similar transmissions in which the planetary gearing also performs the function of drive-splitting in order to diminish the losses in the converter. The same is also achieved by locking-out the converter with a clutch. All these designs have certain shortcomings, especially the necessity to lay out the converter within a compromise between best converting and best coupling efficiencies. Another known transmission which uses drivesplitting by the planetary gearing behind the converter, called the "collecting" type of drive-splitting, does not make use of all the advantages it could offer; on the one hand, because the converter can only be used in one of its working conditions in each gear (either "open" or split) so that the compromise in the lay-out of the converter has to be maintained, on the other hand because the characteristics were not used which can be obtained with the combination of certain types of converters with certain ratios of drive-splitting. Other known transmissions with a converter lock-up, use the converter mainly for starting the vehicle; if used also to bridge-over the shifts from one ratio to the other, they overstress the shifting clutches or reaction brakes by high differential speeds between the parts to be synchronized.

The present invention refers to a design in which certain characteristics of a converter are combined with a design in which at least two working phases are used in each gear, one of which being the "open" converter, the other being drive-splitting of the "collecting" variety, and the third the lock-up. Its main feature is that in the splitting phase converting and coupling characteristics are obtained, which cannot be duplicated by any type of coupling-converter. The condition is, that certain converter characteristics are combined with certain splitting ratios, these being a stall conversion of 2.8 to 3.6 and a splitting ratio in which, during coupling, the hydraulic driveline carries 40% to 65% of the engine torque.

The following advantages are obtained over other known transmissions: a "two-converter effect" by a converter with a high stall conversion of 3.0 to 3.6 and a steeply rising efficiency curve for starting and accelerating, and, at certain speed-ratios when the efficiency starts to level-off (at speed ratios of about 0.5), a "second" converter represented by the first converter, in a drive-splitting configuration.

The effect of this is, that the efficiency rises again steeply and the coupling point is extended to a speed-ratio of 0.9 and over. Beyond this point, coupling slip is about 66% less than the coupling slip of the "open" converter. The result is a driving condition with "two" converters, completing each-other, because one offers highest starting and acceleration pull, the other highest efficiency. Another important advantage is, that the stall speed can be freely chosen, without compromising on coupling efficiency, because the "second" converter corresponds to one, which would have a hydraulic diameter about 20% larger, than the first. Thus a much wider field of engine characteristics can be exploited, in comparison with an usual converter. High stall speeds can be chosen to convert the higher engine torque for easy starts on steep roads at higher altitudes, when engine torque falls off. On the other hand, the "second" converter will pull engine r.p.m. down to such an extent that part-power can be used at high engine efficiencies, especially in the case of petrol engines, not to speak of efficiencies during coupling, when slip values drop by about 66% over those of an "open" converter.

Referring to this last point, converters have been known which have been laid-out for best coupling efficiencies and therefore had to compromise on conversion values. One of them corresponds indeed, in its coupling range, to the "second" converter of this invention, but its stall conversion is of only 1.35 at an efficiency of 0%, whereas the "second" converter of this invention has a stall conversion of 1.6 at an efficiency of 75%.

These exceptionally good converting and coupling characteristics, which represent the main feature of this invention, are obtained by a transmission design (called further down "basic transmission") including a converter as specified, and an input clutch, each driving through a separate drive-shaft a planetary gearing giving different drive ratios and the drive-split, as indicated. Between both drive shafts, or drive-lines, a freewheel is located, which could also be any other type of suitable clutch.

This "basic transmission" offers, in combination with certain types of engines and certain additional transmissions, a number of progressive designs which will now be described.

One design of this invention features the cooperation of the basic transmission with a supercharged internal combustion piston engine in such a way, that the supercharging speed range starts approximately with the coupling point of the "second converter." Supercharging is therefore mainly effective during the conversion speed-range of the "second converter," adding its torque augmention to the one obtained by the transmission. The result is a steeply rising torque curve with falling vehicle speed, giving an extremely elastic and shift-free drive, under high efficiency conditions. As an example, a simple turbosupercharger without aftercooler could raise the engine torque, at low speeds, by at least 40%; the transmission would add another 60%, so that the resulting torque curve would peak at a point 2.25 times higher than the peak of the engine torque curve. It is true that combinations are known in which a differential drive of a supercharger and a transmission gives a similar effect of "constant HP" but the complications of this known combination and the load it imposes on the engine are by far less favourable than here.

Another variant of this invention refers to the cooperation of the basic transmission with an auxiliary gearbox. One version provides a basic transmission with a step between the two ratios of more than 2:1, and an auxiliary gearbox with steps of less than 2:1. The first is therefore used as a range selector, the second performs the usual gearshifts. In order to reduce by a considerable margin the work imposed on the clutches and reaction brakes, the hydraulic driveline of the basic transmission will carry, in this example, more than 50% of the engine torque (in coupling range) giving in the auxiliary gearbox, with steps of about 1.6 to 1.7, a reduction of the differential speeds of the shifting elements by more than ¾. Besides reducing the wear and tear on the shifting clutches and reaction brakes, this also smooths the shifts to a considerable extent. But here also such a "bridging" of gearsteps by the converter is already known, but in those cases differential speeds are much larger, and efficiency during bridging falls off far more, than in the present invention. Furthermore the frequency of shifts of those other known designs is much higher, because of the unfavourable efficiency conditions, which do not allow to stay for long time in the converter. In this invention, the efficiency of conversion during the split condition is to such an extent superior, that driving can be continued, without any shifts, at any length of time, up to conversion ratios corresponding to the next step of the auxiliary gearbox. As one can see, this variant of the present invention is especially suitable for trucks, on and off the highway. This, because the low range of the main transmission with its two phases (open converter and lock-up) gives, off the road, highest pulling power, whereas the high ratio of the basic transmission, with its two phases (open converter and drive-split) gives, on the road, highest drive elasticity with the least number of shifts. Another feature of this variant is, that a transmission can be designed featuring 4 sets of interchangeable, simple planetary grearsets with 6 forward and two reverse speeds, giving important production and service advantages.

Still another variant of this invention refers to a basic transmission with steps of less than 2:1, which would be the shifting unit, and an auxiliary gearbox with steps of over 2:1 which would select two or three drive ranges. This variant is especially suitable for small, 4-wheel drive vehicles. The split-drive in high gear of the basic transmission, in combination with one low range of the auxiliary box, gives, off the road, and extremely elastic and shiftfree driving condition, extending from lowest vehicle speeds to speeds corresponding to the highest engine r.p.m., a condition which is especially favorable for new countries and insufficiently trained drivers. Wear and tear of the whole drive and the tires will be much reduced, an important condition for any country. This drive gives quite a new effect for this category of vehicles, because of the foolproofness and easy driving conditions at highest efficiency values.

Another variant consists in the cooperation of the basic transmission with an infinitely variable mechanical transmission, such as have been known under the names of friction-wheel, friction-ring, P.I.V., ball and cone planetaries, and other similar types. In this cooperation, the basic transmission will have a simple planetary gearset, because it provides besides neutral, forward drive and drivesplit, only the reverse drive. However, and if a freewheel clutch is used between the two drivelines, this freewheel will have to be disconnected during reverse drive, which can be done, f.i., by sliding the rollers or wedges ver a freely rotating bushing. The cooperation of stepless hydraulic and mechanical conversions can extend the torque range of the transmission to such an extent, that an ovedrive effect can be achieved, with a simultaneous augmentation of the starting torque. The "second" converter of the present invention together with the infinitely variable mechanical drive, will allow engine "pulldown" for efficient driving both at two and cruising speeds, since the infinitely variable mechanical drive does not require the engine to run at part throttle and higher r.p.m. in order to maintain a torque reserve for acceleration (overtaking). Under both conditions, exhaust gases will be free of carbon monoxide and free of hydrocarbons, and, at any time, highest power is available. Further objects of the invention will be apparent from the following description when considered in connection with the accompanying drawings in which:

FIG. 1 is a diagrammatic view of the transmission and FIGS. 2 to 6 are diagrams showing torque and efficiency curves.

FIG. 7 is a diagrammatic view of the free wheeling clutch.

Figure 1:
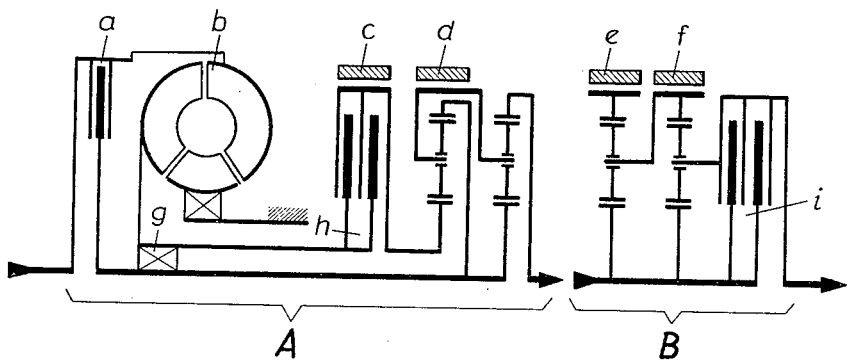

The invention is exemplified by the following figures. FIG. 1 shows an example of a basic transmission with a step between the two ratios of more than 2:1, and an auxiliary gearbox with steps of less than 2:1, between its 3 gears. The basic transmission acts as a range selector, the auxiliary gearbox does the normal shifting, in each range. In high range (split drive) of the basic transmission, the rising torque output with falling speed as shown in FIG. 5 "bridges" the gear-shift in the auxiliary gearbox, as described in pages 5 and 6. A is the basic transmission, with two gears forward and one reverse. The following clutches or reaction brakes are energized in the following gears or drive phases:

Low gear, opened converter _____ b–g–c
Low gear, lock-up _____ a–c
Direct drive, opened converter _____ b–g–h
Direct drive and drive split _____ a–h–b
Reverse, opened converter _____ b–g–d
Converter as retarder _____ a–c–h–b in which $a$ represents the clutch for drive splitting and lock-up, $b$ the converter-coupling, $c$ and $d$ are reaction brakes, $g$ the freewheel, and $h$ the direct drive clutch. B represents the auxiliary gearbox with the reaction brakes $e$ and $f$ and the direct drive clutch $i$. In direct drive and drive split, the auxiliary gearbox will be power-shifted, whereby the split-drive torque-curve will bridge over the shifts without noticeable shock, see FIG. 5.

Figure 2:
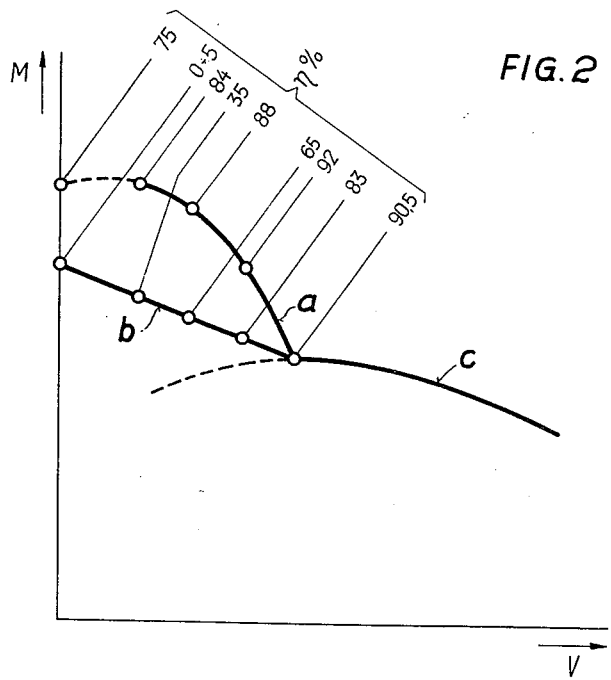

FIG. 2 shows the torque curve $c$ of the engine, the torque-curve $a$ of the split drive, and the torque-curve of a coupling-converter laid out for similar coupling characteristics as the split drive of this invention and a similar coupling point (at 0.905). The comparative hydraulic efficiencies are shown in the figure and one can see how far the efficiency and converting values of the split drive according to this invention are superior to those of the open converter laid out for the same coupling characteristics. The end portion of the torque curve for the split-drive is dotted, because we encounter here cavitation conditions, which has no practical bearing on the drive since at this point, or before, the converter will be opened, or the next lower gear will be engaged (see FIG. 1).

Figure 3:
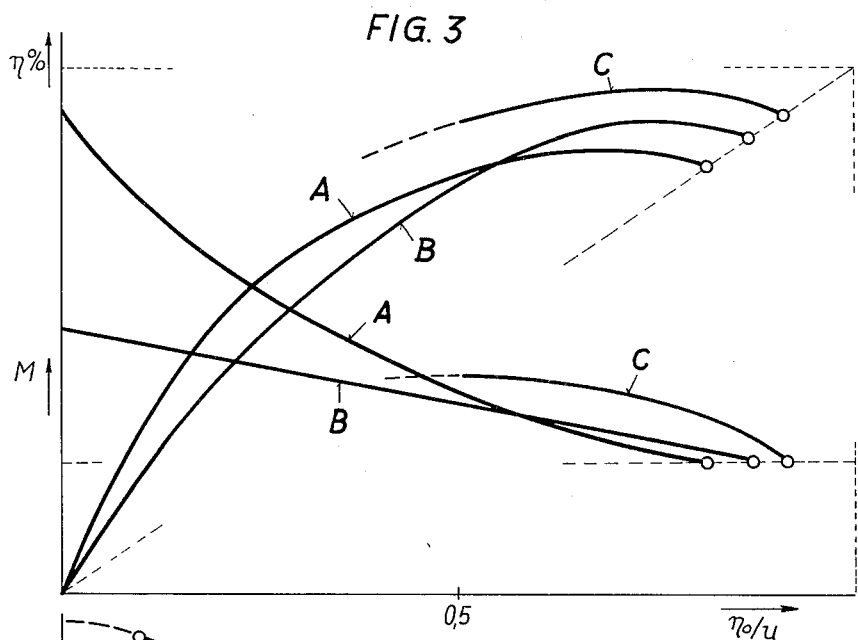

FIG. 3 compares a torque converter as used in most automatic transmissions with the combination of "two" converters of this invention. A shows the torque and efficiency curves of a converter with a stall torque conversion of 3.6 and B the same curves for a converter of an usual type with a stall torque conversion of 2.0; C are the curves of converter A in the drive-split. One can see how the combination of curves A and C are superior to those of the usual converter.

Figure 4:
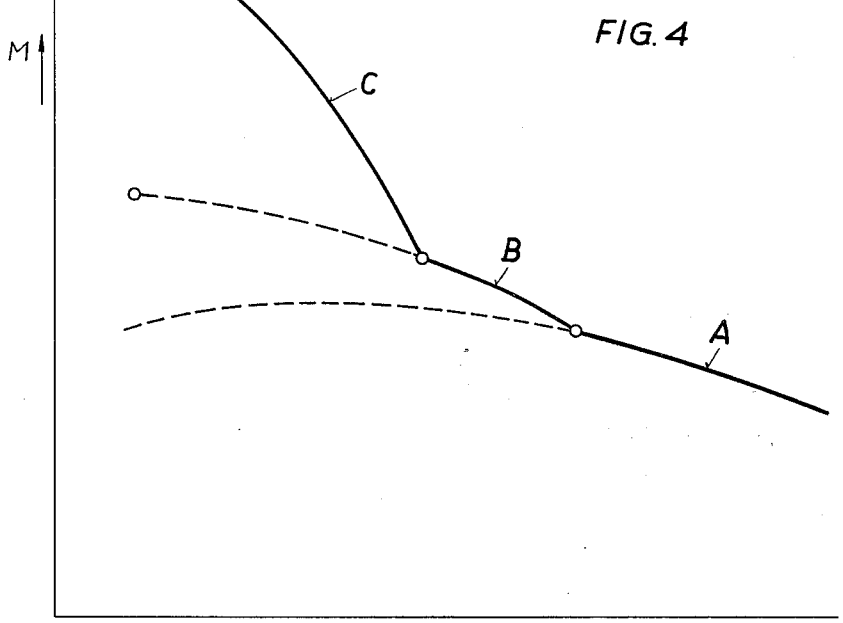

FIG. 4 shows the torque augmentation in the lower speed range of the combination of a supercharged engine with the drive split of the basic transmission. A is the torque curve of an engine, B the curve of the same engine supercharged as required by this invention, and C the torque curve of the split-drive of the basic transmission. One can see the step rise of the torque curve at falling speeds whereby the hydraulic efficiencies are those of FIG. 2.

FIG. 5 shows the bridging of the gear steps of the auxiliary gearbox with steps of 1.6. A is the torque curve in one gear, B the one in the next lower gear, and C the torque curve of the split drive. At the shift points D and D' the differential speed would be of only 200 r.p.m., and the efficiency at about 90%. As already mentioned in the foregoing, this is a very important characteristic, especially for heavy vehicles because it reduces considerably the wear of the clutches and reaction brakes, not to speak of the smoothness of gear changes, with little slip of the clutches. The reduction of differential speeds between the shifting elements to such an extent and at such high efficiency values, is entirely new to the art, giving importance to the ratios set forth.

FIG. 6 shows the cooperation of the basic transmission with an infinitely variable mechanical transmission. $a$–$b$ is the torque curve of the mechanical transmission; $b$–$c$ the torque curve of the engine and $c$–$d$ the torque curve of the drive-split—all at full power. For economical driving the mechanical transmission will be blocked at $b'$ (as an example) whereby the torque curve will now be $b'$–$c'$ and $c'$–$d'$ the torque curve of the split-drive at this point. Economical driving on superhighways will be performed along the curve $a$–$e$, at low r.p.m. and low torque reserve. Should one need a high passing torque one can allow the governer to shift to curve $a$–$b$. The curves for the opened converter are $h$.

I claim:

1. A transmission, particularly for automotive vehicles, comprising a Foettinger-Trilok converter, a clutch connecting an input shaft with at least one gear of a planetary gearing and constituting one drive line, a second drive line connecting said converter with another gear of said planetary gearing through a second clutch, both said drive lines being connectable to each other by a third clutch, said planetary gearing providing gearshifting for neutral, at least one speed forward and reverse, said converter having a stall conversion of at least 2.8, said two drive lines and their respective associated gears constituting with said planetary gearing a split drive, said gears being dimensioned to insure that the second drive line carries at least 40% of the input torque when said converter is in coupling range.

2. The transmission as claimed in claim 1 wherein there is provided a supercharged piston-type combustion engine driving said transmission through said input shaft, said transmission, when in split-drive, having its coupling-point at a speed of less than 50% of said engine's maximum r.p.m., said engine being supercharged from said speed downwards towards said converter's stall r.p.m. in split-drive.

3. The transmission as claimed in claim 1 wherein there is provided an auxiliary gearbox with gear ratios of less than 2:1 and shifting elements, said transmission comprising at least two gear ratios with steps between said ratios of more than 2:1, said steps producing in split-drive a torque curve such as to reduce the differential speed of said shifting elements in said auxiliary gearbox.

4. The transmission as claimed in claim 1 also being provided with an infinitely variable mechanical speed changing device, said transmission combining its converter-drive and its split-drive with said infinitely variable mechancal speed changing device.

References Cited

UNITED STATES PATENTS

| | | | |
|---|---|---|---|
| 2,748,622 | 6/1956 | Syrovy et al. | 74—763 |
| 2,835,145 | 5/1958 | Carp | 74—688 |
| 2,874,590 | 2/1959 | Kelbel | 74—763 X |
| 2,956,449 | 10/1960 | Foerster | 74—730 |
| 3,033,333 | 5/1962 | Breting et al. | 74—765 X |
| 3,039,327 | 6/1962 | Breting | 74—764 X |
| 3,096,666 | 7/1963 | Christenson et al. | 74—765 X |
| 3,209,618 | 10/1965 | Schwab | 74—688 |
| 3,362,259 | 1/1968 | Hayward | 74—688 X |
| 3,407,686 | 10/1968 | Tuck et al. | 74—765 X |
| 3,410,157 | 11/1968 | Livezey | 74—764 X |

FOREIGN PATENTS 351,612  7/1931  Great Britain.

ARTHUR T. McKEON, Primary Examiner

U.S. Cl. X.R.

74—763, 765; 192—328